United States Patent Office 3,519,536
Patented July 7, 1970

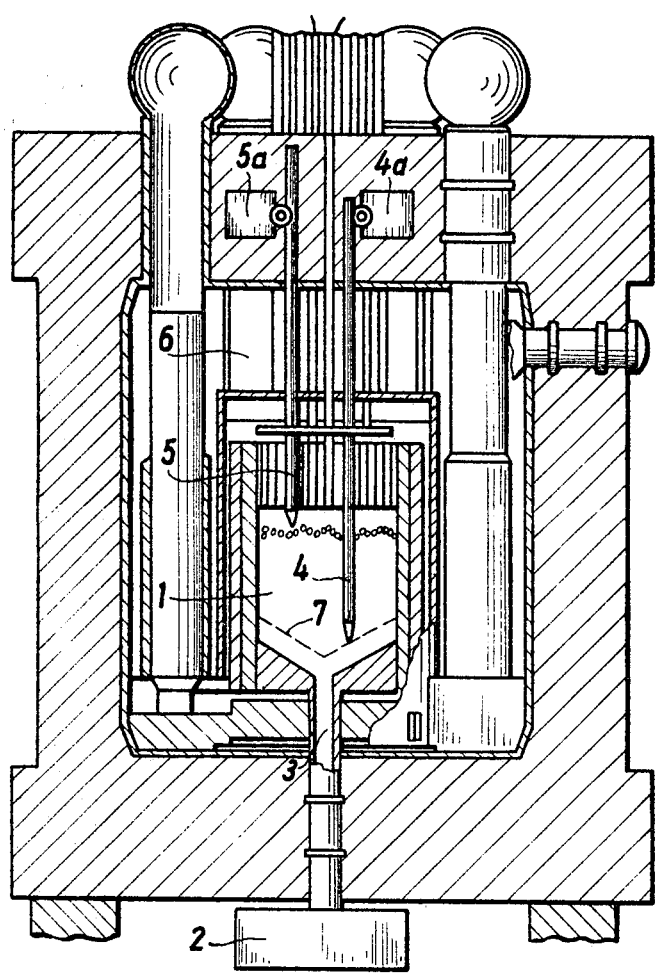
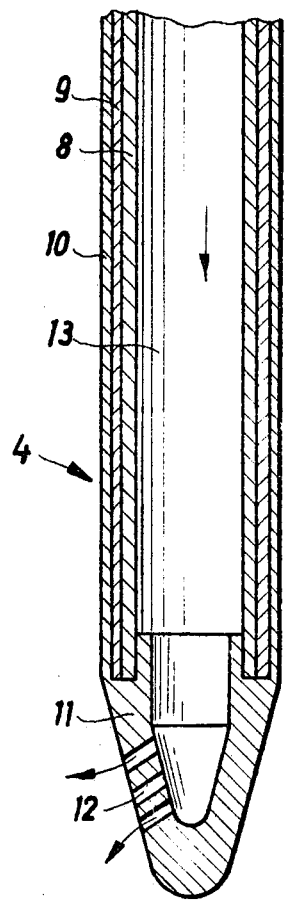

3,519,536
METHOD OF CONTROLLING NUCLEAR REACTORS
Wilfried Rausch, Dollweg, Germany, assignor to Brown Boveri/Krupp Reaktorbau G.m.b.H., Dusseldorf, Germany, a German company
Filed Aug. 2, 1967, Ser. No. 657,934
Int. Cl. G21c 7/08
U.S. Cl. 176—36     1 Claim

ABSTRACT OF THE DISCLOSURE

A packed or "pebble bed" reactor is shut down by inserting the control rods directly into the packing of fuel elements.

---

This invention relates to nuclear reactors and processes for operating such reactors.

This invention is concerned with a nuclear reactor having a core containing conveniently identical and preferably spherical working elements, in whose zone rod-shaped control rods or shut-down elements can be introduced, and with a process for regulating or shutting down such nuclear reactors.

Gas-filled "pebble bed" nuclear reactors having negative temperature coefficients are known in which the effect on the reactivity that is required for shutting down the nuclear reactor is achieved by means of shut down rods which are guided within special guide tubes or guide recesses provided in the reactor. The output of such nuclear reactors is controlled, using the negative temperature coefficient, by changing the speed of rotation of the blower fan in the cooling gas circuit. Such a known type of output control is however not adequate for all nuclear reactors of this type since there would be excessively great temperature differences at the individual output levels. These temperature differences can be avoided in a known manner by building into the reactor suitable trim rods which allow the reactivity of the reactor to be changed reproducibly and in sufficiently small stages. The entire reactivity change in this case is within the range of a few percent. Such nuclear reactors can also be shut down by means of shut down rods, provided one ensures that it is possible to go below an appropriate reactivity limit under all operating conditions of the nuclear reactor.

The present invention has as its object the provision of a process which permits the reactivity of a "pebble bed" nuclear reactor to be influenced without requiring the necessity of interfering built-in structures in the core.

According to one aspect of this invention there is provided a process for controlling or shutting down a nuclear reactor having a packing of operating elements into which rod-shaped control or shut-down elements can be introduced, the said process comprising directly introducing the rod-shaped elements into the packing with displacement of the fuel elements thereof. Particularly the emergency shut-down of the nuclear reactor preferably takes place in two stages whereof in a first stage, the rod-shaped elements disposed outside the packing fall under the influence of gravity into the packing up to a predetermined depth, and in the subsequent stage the rod-shaped elements are advanced up to the limiting position by means of external forced propulsion, whilst overcoming the penetration resistance of the packing.

If desired, the penetration resistance of the packing may be reduced by a change in the geometry of the packing, preferably by removal and return of the packing material. Conveniently, the operational shutting down of the nuclear reactor takes place through slow penetration of the rod-shaped elements up to a predetermined depth in the packing.

According to another aspect of this invention there is provided a nuclear reactor comprising a packing of preferably identical and preferably spherical operating elements, a plurality of rod-shaped control or shut-down elements, a roof reflector above the packing, channels provided in the roof reflector of the nuclear reactor in which the rod-shaped elements are guided during the lowering motion. The rod-shaped elements preferably are disposed so that they can be lowered without rotational movement.

Preferably the rod-shaped elements consist of a neutron absorber in the interior of the rods and an external metal jacket which is of such shape as to facilitate penetration into the packing preferably by being pointed at their penetration end. Preferably the rod-shaped elements are provided with cooling ribs. Preferably the rod-shaped elements have at least one internal passage hole for the passage of cooling gas, which passage hole leads to several perforations of the wall of the rod-shaped element, these perforations preferably being so arranged that when the rod-shaped element has been completely introduced some of the perforations are above the surface of the packing whilst the other perforations are within the packing.

Conveniently vibrational drive means is provided to introduce the rods into the packing.

An embodiment of the invention will now be described, by way of example, with reference to the accompanying schematic drawings.

In the drawings:

FIG. 1 is a longitudinal section through a nuclear reactor of the invention, and FIG. 2 shows a longitudinal section through the lower part of a shut-down rod for the nuclear reactor of FIG. 1.

Referring now to FIG. 1, there is shown a "pebble bed" nuclear reactor having a core 1 provided with a packing of fuel elements. These core fuel elements may include many types of reactor working elements, and may, for example, be of spherical or regular polyhedral form, and also of irregular lump form. The fuel elements are circulated, and the geometry of the packing changed if appropriate, by means of a circulating device 2 which is connected to the core 1 through a supply channel 3. Two control or shut-down rods 4 and 5 are illustrated. One such rod 4 has been introduced into the packing displacing the packing fuel elements and has already reached its lower limiting position. The other rod 5 is still above the packing, before being inserted therein. A roof reflector 6 is provided above the reactor core 1, and this reflector 6 has appropriate perforations or channels through which the rods 4 and 5 pass. The rods 4 and 5 are each carried in a torque-free manner at their suspension end so that if the rods deviate slightly from the vertical position no rotational movements arise which would cause additional frictional forces. Though only two shut-down or control rods 4 and 5 are shown in the drawings, a multiplicity of such rods are used for the practical execution of the invention and in the fully introduced position their tips touch a conical surface marked 7. The remaining details of the reactor correspond to the known construction of nuclear reactors.

The shut-down or control rods 4 and 5 are normally movable by their drives 4a and 5a respectively. These drives 4a and 5a are used for the operational shutting down of the reactor. For this purpose, the drives 4a and 5a force the shut-down rods 4 and 5 to penetrate into the packing up to a predetermined depth.

The introduction of the rods 4 and 5 into the packing can take place in other ways, for example, the rods may move at least part of the way under the influence of gravity and part of the way under a forced drive by the drives 4a and 5a. Care must be taken that the speed of the falling rods should not cause any damage to the operating elements, especially the fuel elements in the packing. This free falling technique is appropriate for emergency shut-down of the nuclear reactor which takes place in the following stages, viz: In the first stage, the shut-down rods 4 and 5 fall under the influence of gravity through the reflector 6 to a predetermined depth in the packing 1 and, in a subsequent stage, these shut-down rods are advanced to the final position by external forced advancement with the penetration resistance of the packing 1 being overcome. Whilst an immediate reduction in reactivity is caused as the rods 4 and 5 fall in the packing, an additional slow reduction of reactivity can be produced by the forced advance in the subsequent stage. This technique results from our recognition that even in an emergency shut-down in the event of a nuclear disturbance, it suffices to carry out a part of the necessary reactivity change by slowly reducing the reactivity. The shut-down process may therefore be appropriately designed so that in the first stage there is an immediate reduction of reactivity to compensate for the reactivity increase arising from a significant operating disturbance (e.g. water infiltration from a water-fed secondary circuit). In the subsequent forced advance stage, the slow reactivity change takes place as the shut-down rods are further introduced into the packing, and in this stage, the degree of retardation at which the reactivity change takes place can be freely selected by appropriately choosing the speed of advance of the control rods.

The advance of the shut-down rods 4 and 5 in the packing 1 may be appropriately facilitated by reducing a counteracting resistance of the packing by changing its geometry. Such a change in the geometry may advantageously be carried out by removal and return of the packing. The shut-down rods 4 and 5 may also be provided with a common drive or the individual drives 4a and 5a as appropriate in order to overcome the resistance to penetration prevailing in the packing and to permit the rods to penetrate more deely into the core. A further possibility for achieving deeper penetration of the shut-down rods into the packing may consist of the rods being caused to vibrate by means of a suitable drive. The drives may be pneumatic or electromagnetic. The latter is appropriate for vibrating drives. If the nuclear reactor is shut down in the course of operation, the reduction of reactivity required for such a case may also be brought about by means of shut-down rods which are slowly, and without any impediment, introduced up to a predetermined depth into the packing.

Referring now to FIG. 2, it is seen that the preferred shut-down or control rod 4 therein shown consists of a carrier tube 8 surrounded by a neutron absorber layer 9 which is clad with an outer sheath 10 of high temperature-resistant steel. The outer sheath 10 has a pointed penetrating tip 11 in the shape of a rounded cone. Perforations 12 are provided in the zone of the conical tip, from which perforations the cooling gas passed through an internal tube-shaped passage 13 can issue towards the packing. These or additional perforations of the wall of the rod-shaped element may be so disposed that when the rod-shaped element has been completely introduced a part of the perforations are above the surface of the packing while the other part of these perforations is in the packing. With such a construction the pressure drop of the cooling medium, preferably the cooling gas, over the length of the introduced rod can be utilised for allowing a part of the coolant to flow through the internal passage 13 of the rod. It is a prerequisite for the effectiveness of this cooling that at a higher core temperature at least a part of the fan blower system for the coolant circuit should be operational. An additional advantage resulting from this construction is that the amount of coolant flowing through the shut-down or control rod is automatically regulated according to the size of the pressure drop prevailing in the rod. As long as the rod is outside the packing there is practically no flow of coolant whilst with the rod completely introduced, the desired maximum cooling effect is achieved. The holes or perforations in the rod ends are appropriately of such shapes as cannot be completely covered over by the operating elements. In this context, for example, a cross-cut running into several grooves, or similar constructions, would be advantageous.

The shut-down rods 4 and 5 may be either of circular cross-section or may be of such a cross-section that a multiplicity of grooves are formed on the outside surface. These grooves may be parallel-sided, angular or domed in section. Yet again, the shut-down rods may be provided with external cooling ribs in order to be able better to conduct away the heat generated after penetration of the rods into the packing. These cooling ribs should also increase the cooling effect which necessarily arises on passing a coolant through the packing, since the heat transfer between the shut-down rod and the coolant is improved by enlarging the rod surface and further the heat exchange between the shut-down rod and the adjacent fuel elements is reduced through providing ribs, because of the smaller contact area between the rod and the fuel elements. We demonstrated experimentally that in a packing core a forced cooling effect occurs at the shut-down rods, if a coolant flows through the packing in a downward direction. This cooling effect is caused by the heat transfer in the vicinity of a smooth surface increasing noticeably since at this point the bulk density is considerably reduced. It should further be noted that the output of the fuel elements immediately adjacent to the shut-down rod will be less than the average output of the fuel elements as a result of the reduction of flux in the vicinity of this rod.

We have found that the apparatus and techniques described above solve the problem of being able to influence the reactivity of a packed or "pebble bed" nuclear reactor without special constructional or material problems arising. A significant advantage of the present process is the fact that the core requires no additional built-in structures, which can be subjected to high mechanical, thermal and radiation stresses. Furthermore, as a result of the absence of such built-in elements required for guiding the rods, good neutron economy results and this is of great importance where the process is to be used for influencing the reactivity of converter or breeder reactors. The control rods on being introduced, respectively form the requisite channels by displacing the packing, and after retraction of these elements from the core the channels automatically close. Apart from the control rods which serve to control the output of the nuclear reactor and to shut it down, and which must therefore contain neturon absorbing substances, all manner of test elements, irradiation samples or the like can be introduced into the core of a packed nuclear reactor controlled in this manner. This is effected by placing these elements or samples directly into the control rods and introducing them, in the rod, directly into the packing at the desired point of the core. The reactivity of the nuclear reactor will only be influenced as long as the samples or test elements are present in the core.

I claim:

1. A process for controlling including shut-down a nuclear reactor having a core container containing a settled packed bed of pebbles, some of which are fuel elements, comprising introducing rod-shaped control elements with substantially conical inserting ends and containing a neutron absorber into the spaces between said pebbles of said bed with a displacement of some of the pebbles thereof.

References Cited

UNITED STATES PATENTS

| | | | |
|---|---|---|---|
| 3,046,212 | 7/1962 | Anderson | 176—45 |
| 3,100,187 | 8/1963 | Fraas | 176—32 |
| 3,140,235 | 7/1964 | Hatch et al. | 176—32 |
| 3,239,425 | 3/1966 | Guneratne | 176—68 |
| 3,336,203 | 8/1967 | Rausch et al. | 176—31 |

FOREIGN PATENTS

| | | |
|---|---|---|
| 749,064 | 5/1956 | Great Britain. |
| 1,172,380 | 6/1964 | Germasy. |
| 1,199,896 | 9/1965 | Germany. |
| 1,191,408 | 10/1959 | France. |

CARL D. QUARFORTH, Primary Examiner

H. E. BEHREND, Assistant Examiner